(12) United States Patent
Yang et al.

(10) Patent No.: US 11,785,198 B2
(45) Date of Patent: Oct. 10, 2023

(54) HEAD-MOUNTED DEVICE

(71) Applicant: LARGAN PRECISION CO., LTD., Taichung (TW)

(72) Inventors: Fuh-Shyang Yang, Taichung (TW); Hsiang-Chi Tang, Taichung (TW); Tsung-Han Tsai, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 17/477,191

(22) Filed: Sep. 16, 2021

(65) Prior Publication Data

US 2022/0286662 A1    Sep. 8, 2022

(30) Foreign Application Priority Data

Mar. 5, 2021    (TW) .................................. 110107855

(51) Int. Cl.
| | |
|---|---|
| *H04N 13/243* | (2018.01) |
| *G02B 1/00* | (2006.01) |
| *G02B 27/00* | (2006.01) |
| *G02B 27/01* | (2006.01) |
| *G02B 7/04* | (2021.01) |

(Continued)

(52) U.S. Cl.
CPC ............ *H04N 13/243* (2018.05); *G02B 1/002* (2013.01); *G02B 7/04* (2013.01); *G02B 27/0093* (2013.01); *G02B 27/0172* (2013.01); *H04N 13/271* (2018.05); *H04N 13/344* (2018.05); *H04N 13/383* (2018.05); *H04N 23/698* (2023.01); *H04N 23/90* (2023.01); *G02B 2027/014* (2013.01); *G02B 2027/0138* (2013.01)

(58) Field of Classification Search
None
See application file for complete search history.

(56) References Cited

U.S. PATENT DOCUMENTS

| | | | |
|---|---|---|---|
| 8,022,977 | B2 | 9/2011 | Kanade et al. |
| 9,389,423 | B2 | 7/2016 | Bhardwaj et al. |

(Continued)

FOREIGN PATENT DOCUMENTS

| | | |
|---|---|---|
| CN | 108333751 A | 7/2018 |
| CN | 209311784 U | 8/2019 |
| TW | I683136 B | 1/2020 |

OTHER PUBLICATIONS

India Examination Report dated Sep. 27, 2022 as received in application No. 202134056830.

(Continued)

*Primary Examiner* — Edemio Navas, Jr.
(74) *Attorney, Agent, or Firm* — Maschoff Brennan

(57) ABSTRACT

A head-mounted device includes a plurality of front camera modules, a display device, an in-display camera module and an image-processing unit. The front camera modules include a first camera module and a second camera module that are respectively disposed at the left and right sides of the head-mounted device. The in-display camera module is disposed within the boundary of the display device. The image-processing unit is in communication connection with the front camera modules and the display device. The display device and the in-display camera module face a user side of the head-mounted device.

25 Claims, 12 Drawing Sheets

(51) Int. Cl.
*H04N 13/271* (2018.01)
*H04N 13/344* (2018.01)
*H04N 13/383* (2018.01)
*H04N 5/232* (2006.01)
*H04N 5/247* (2006.01)
*H04N 23/90* (2023.01)
*H04N 23/698* (2023.01)

(56) References Cited

U.S. PATENT DOCUMENTS

| | | | |
|---|---|---|---|
| 9,851,564 | B2 | 12/2017 | Riccomini et al. |
| 10,203,489 | B2 | 2/2019 | Khan et al. |
| 10,310,598 | B2 | 6/2019 | Trail et al. |
| 10,330,935 | B2 | 6/2019 | Shpunt |
| 10,429,656 | B1 | 10/2019 | Sharma et al. |
| 10,506,217 | B2 | 12/2019 | Linde et al. |
| 10,627,620 | B2 | 4/2020 | Yajima |
| 10,788,677 | B2 | 9/2020 | Geng et al. |
| 10,816,804 | B2 | 10/2020 | Martinez et al. |
| 10,816,810 | B1 | 10/2020 | Choi et al. |
| 11,082,606 | B1* | 8/2021 | Gamadia ............... G06V 10/25 |
| 11,099,643 | B1* | 8/2021 | Miller .................. H04N 9/3173 |
| 11,158,126 | B1* | 10/2021 | Petrov .................... G06F 3/012 |
| 11,175,503 | B2 | 11/2021 | Franklin |
| 11,204,504 | B1* | 12/2021 | Jacobs ............... G02B 27/0176 |
| 2015/0049165 | A1* | 2/2015 | Choi ...................... H04N 7/144 |
| | | | 348/14.16 |
| 2018/0054611 | A1* | 2/2018 | Shin ...................... H04N 13/359 |
| 2018/0081092 | A1 | 3/2018 | Hudman |
| 2019/0158819 | A1 | 5/2019 | Hong |
| 2019/0220343 | A1* | 7/2019 | Park ....................... G09G 5/393 |
| 2019/0384062 | A1 | 12/2019 | Wilson et al. |
| 2019/0392639 | A1* | 12/2019 | Kitain ................... G09B 9/302 |
| 2020/0033586 | A1 | 1/2020 | Suzuki et al. |
| 2020/0049956 | A1 | 2/2020 | Chan |
| 2020/0225489 | A1 | 7/2020 | Huo et al. |
| 2020/0272022 | A1 | 8/2020 | Myhre et al. |
| 2020/0401361 | A1 | 12/2020 | Han et al. |
| 2020/0410921 | A1 | 12/2020 | Kim et al. |
| 2021/0041948 | A1* | 2/2021 | Berkner-Cieslicki ........................ |
| | | | G06F 3/011 |
| 2021/0183102 | A1* | 6/2021 | Tang ....................... G06T 15/06 |
| 2021/0365535 | A1* | 11/2021 | Castañeda ........... H04L 63/0861 |
| 2021/0368081 | A1* | 11/2021 | Kim ...................... H04N 5/2257 |
| 2021/0405255 | A1* | 12/2021 | Kress .................... H01L 27/156 |
| 2022/0066221 | A1* | 3/2022 | Yoon .................... G02B 27/0093 |
| 2022/0076037 | A1* | 3/2022 | Hochman ............. G05D 1/0246 |

OTHER PUBLICATIONS

Taiwan Office Action dated Jan. 3, 2023 as received in application No. 110107855.

* cited by examiner

HEAD-MOUNTED DEVICE

RELATED APPLICATIONS

This application claims priority to Taiwan Application 110107855, filed on Mar. 5, 2021, which is incorporated by reference herein in its entirety.

BACKGROUND

Technical Field

The present disclosure relates to a head-mounted device, more particularly to a head-mounted device including an in-display camera module.

Description of Related Art

With the advancement of semiconductor manufacturing technology, the performance of miniature electronic components has been improved, and image sensors for having more pixels has been scaled down. Therefore, featuring high image quality becomes one of the indispensable features of a miniature optical system nowadays. Furthermore, due to the popularization of high-performance microprocessors and microdisplays, the technology related to smart head-mounted devices rapidly develops in recent years. With the rise of artificial intelligence, electronic devices equipped with optical systems are trending towards multi-functionality for various applications, and the functional requirements for computer vision have been increasing.

The head-mounted devices have become smaller and more lightweight, and also have various intelligent applications such as virtual reality (VR), augmented reality (AR) and mixed reality (MR) in the rapidly developing technology landscape. Most smart head-mounted devices use conventional imaging camera modules for dynamic user tracking and positioning, and use eye tracking cameras for positioning of the eye gazing direction and thus reducing the burden of real-time image rendering, such that the head-mounted device can provide users with clear and low-latency images to achieve a highly immersive visual experience. However, most head-mounted devices are still too large and too heavy.

SUMMARY

According to one aspect of the present disclosure, a head-mounted device includes a plurality of front camera modules, a display device, an in-display camera module and an image-processing unit. The plurality of front camera modules include a first camera module and a second camera module that are respectively disposed at the left side and the right side of the head-mounted device. The in-display camera module is disposed within the boundary of the display device. The image-processing unit is in communication connection with the plurality of front camera modules and the display device. The first camera module and the second camera module face a front side of the head-mounted device. The display device and the in-display camera module face a user side of the head-mounted device. The front side of the head-mounted device is an opposite side of the user side of the head-mounted device.

According to another aspect of the present disclosure, a head-mounted device includes a plurality of front camera modules, a depth sensing module, a display device, an in-display camera module and an image-processing unit. The plurality of front camera modules include a first camera module and a second camera module that are respectively disposed at two ends of the head-mounted device. The depth sensing module includes an infrared camera module and an infrared illuminator. The in-display camera module is disposed within the boundary of the display device. The image-processing unit is in communication connection with the plurality of front camera modules, the depth sensing module and the display device. The first camera module and the second camera module face a front side of the head-mounted device. The display device and the in-display camera module face a user side of the head-mounted device. The front side of the head-mounted device is an opposite side of the user side of the head-mounted device.

According to another aspect of the present disclosure, a head-mounted device includes at least one front camera module, a display device, two viewing lens elements, an in-display camera module and an image-processing unit. The in-display camera module is disposed within the boundary of the display device. The image-processing unit is in communication connection with the front camera module and the display device. The front camera module faces a front side of the head-mounted device. The display device is configured to display images captured by the front camera module. The display device, the in-display camera module and the viewing lens elements face a user side of the head-mounted device. The front side of the head-mounted device is an opposite side of the user side of the head-mounted device.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
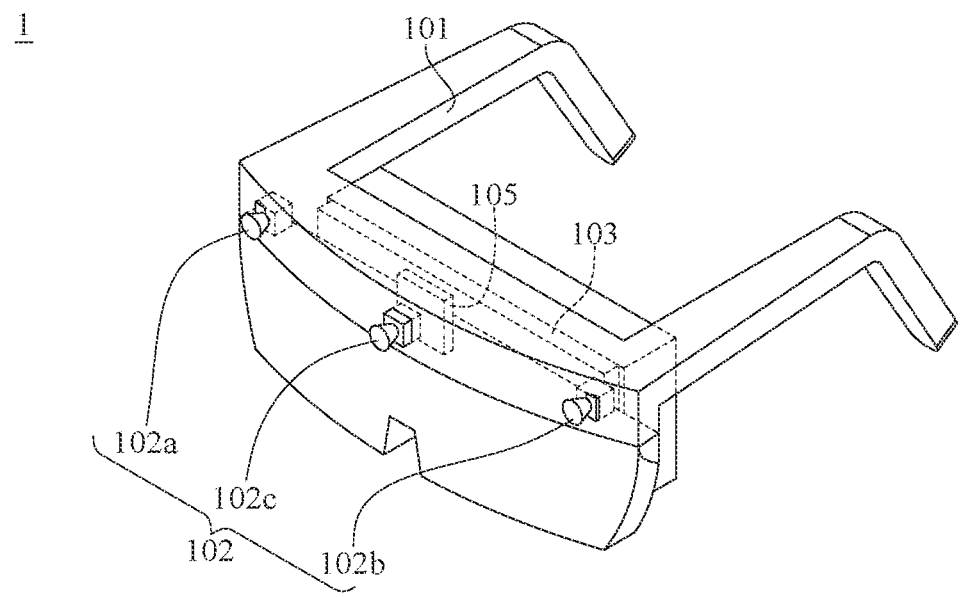
FIG. 1 is a perspective view of a head-mounted device according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Note that the drawings are only illustrative, and the head-mounted device in the drawings may not be in its actual scale.

The present disclosure provides a head-mounted device that includes at least one front camera module, a display device, an in-display camera module and an image-processing unit. Moreover, the head-mounted device can further include two viewing lens elements and a lens actuator.

The front camera module is configured to capture images and is in communication connection with the image-processing unit. Therefore, it is favorable for combining the images from the external real world with virtual images so as to produce augmented images for a user. Moreover, the number of the front camera module can be plural. The plurality of front camera modules include a first camera module and a second camera module that can be respectively disposed at the left side and the right side of the head-mounted device or two ends of the head-mounted device. Therefore, it is favorable for capturing images at different fields of view so as to provide a three-dimensional (3D) image.

The front camera modules can further include a third camera module disposed between the first camera module and the second camera module, and a maximum field of view of the third camera module is smaller than a maximum field of view of the first camera module and a maximum field of view of the second camera module. Therefore, it is favorable for providing the third camera module with a small field of view and a long focal length so as to have a telephoto function for an image zoom from afar.

At least one of the front camera modules can have a maximum field of view larger than 100 degrees. Moreover, the maximum field of view of the first camera module can be larger than 100 degrees. Therefore, it is favorable for having a wide field of view configuration so as to provide a large field of view with a relatively large range of image information during motion tracking and positioning. Moreover, the maximum field of view of the third camera module can be smaller than 50 degrees. Therefore, it is favorable for having a telephoto configuration so as to provide zoom for an image from afar. Moreover, the maximum field of view of the second camera module can range between the maximum field of view of the first camera module and the maximum field of view of the third camera module. Therefore, it is favorable for arranging three camera modules with different image magnifications.

The display device is in communication connection with the image-processing unit so as to display the image captured by the front camera modules. Therefore, it is favorable for having functionality of virtual reality and augmented reality in the head-mounted device. Moreover, the display device can include a curved screen. Therefore, it is favorable for providing a wider viewing angle. Moreover, the display device can include a light-passable display device. Therefore, it is favorable for having functionality of augmented reality in the head-mounted device so that the user can directly see the external real world.

The in-display camera module is disposed within the boundary of the display device, which is different from a conventional head-mounted device in which an eye tracking camera is usually disposed out of the display device. Therefore, it is favorable for reducing the overall size of the head-mounted device. The first camera module and the second camera module face a front side of the head-mounted device. The display device and the in-display camera module face a user side of the head-mounted device opposite to the front side of the head-mounted device, which is favorable for omitting an additional optical reflective element redirecting captured eyes images to an eye tracking camera and enhancing eye tracking.

The in-display camera module can include at least two inside cameras. Moreover, the in-display camera module can include a total of two inside cameras. Therefore, it is favorable for arranging the inside cameras as eye tracking camera modules to correspond to user's respective eyes. Moreover, the inside cameras can be respectively disposed at two ends of the display device. Moreover, the inside cameras can include two hole-punch camera modules. Therefore, it is favorable for reducing the overall size of the head-mounted device and increasing the production yield rate. Moreover, the hole-punch camera modules can be symmetrically disposed at the left side and the right side of the display device. Therefore, it is favorable for capturing images of user's respective eyes. Moreover, the inside cameras can include two under display camera modules. Therefore, it is favorable for hiding the under display camera modules under the display so as to provide a high screen-to-body ratio. Moreover, the under display camera modules can be respectively disposed near central areas of the viewing lens elements. Therefore, it is favorable for aligning the under display camera modules with the user's eyes so as to improve image quality of eye tracking and alternatively, to provide visual acuity test functionality. Moreover, the inside cameras can include two infrared camera (IR camera) modules, and the in-display camera module can further include at least one infrared illuminator (IR illuminator). Therefore, it is favorable for performing eye tracking by using non-visible light so as to prevent visual disruption in user's experience due to the non-visible light not being visible for naked eyes. Moreover, the number of the infrared illuminator can be two. Moreover, the in-display camera module can further include an eye tracking camera. Therefore, it is favorable for processing motion and gaze information of user's eyes. Moreover, the number of the eye tracking camera can be two. Moreover, the eye tracking cameras can include two under display camera modules. Moreover, the under display camera modules can be respectively disposed near central areas of the viewing lens elements. Moreover, the eye tracking cameras can include two infrared camera modules, and the in-display camera module can further include at least one infrared illuminator.

The viewing lens elements are configured corresponding to the user's eyes. Moreover, the viewing lens elements are disposed on a user side of the display device. Therefore, it is favorable for focusing an image from the display device so as to improve image quality in virtual reality of the head-mounted device. Moreover, the viewing lens elements can include two Fresnel lens elements respectively disposed on the left side and the right side of the head-mounted device. Therefore, it is favorable for reducing the size and the weight of the viewing lens elements so as to facilitate miniaturization and lightweight of the head-mounted device. Moreover, the viewing lens elements can include two met-alens elements respectively disposed on the left side and the right side of the head-mounted device. Therefore, it is favorable for further reducing the size and the weight of the viewing lens elements.

The lens actuator is coupled to the viewing lens elements and is capable of moving all of the viewing lens elements simultaneously or each viewing lens element independently. Therefore, it is favorable for adjusting the respective positions of the viewing lens elements to the best focal distance from the user's eyes according to the visual acuity of the user. Specifically, when the in-display camera module performs a visual acuity test for the user's eyes, the image-processing unit will process the captured image of the user's eyes so as to provide the proper displacement values for each viewing lens element; alternatively, the lens actuator can move the viewing lens elements directly after obtaining an optimal focus by the in-display camera module; moreover, there can be an additional manual switch disposed on the lens actuator, such that the additional manual switch can be operated directly to adjust the respective positions of the viewing lens elements. However, the abovementioned movement of the viewing lens elements driven by the lens actuator are only exemplary, and the present disclosure is not limited thereto. Moreover, the lens actuator can be electrically, magnetically or physically coupled to the viewing lens elements so as to move the viewing lens elements via electricity, a magnetic force or a contact force. Moreover, the lens actuator can move the viewing lens elements along at least two axes. Therefore, it is favorable for adjusting the interpupillary distance (IPD) of the viewing lens elements.

According to the present disclosure, the head-mounted device can further include a depth sensing module. The depth sensing module can include an infrared camera module and an infrared illuminator. By arranging the depth sensing module, it is favorable for calculating the depth of a 3D image in a shorter time than using triangulation by two conventional cameras to perform 3D image depth calculation, thereby providing head tracking with low latency and lower power.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
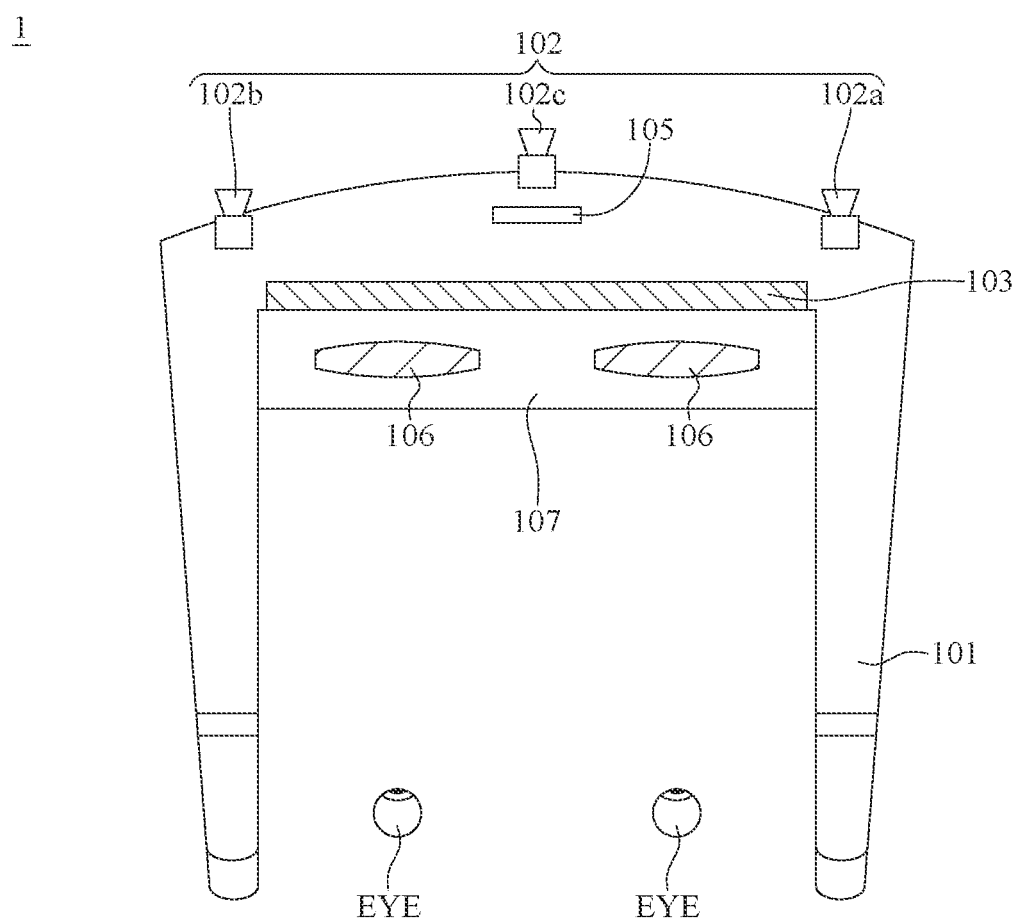
FIG. 2 is a top view of the head-mounted device in FIG. 1 for being coupled to user's eyes.
Figure 3:
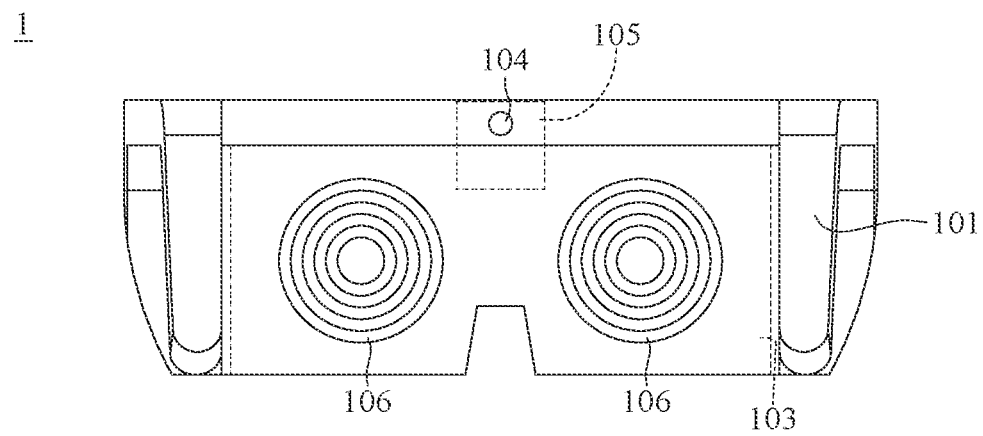
FIG. 3 is a rear view of the head-mounted device in FIG. 1.
Figure 4:
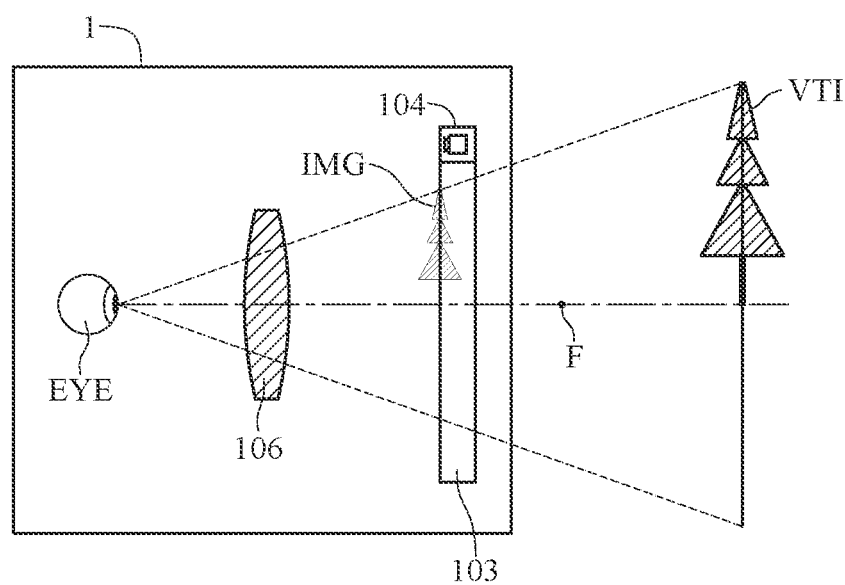
FIG. 4 is a schematic view showing the usage scenario of the head-mounted device in FIG. 1.

Please refer to FIG. 1 to FIG. 4, where FIG. 1 is a perspective view of a head-mounted device according to the 1st embodiment of the present disclosure, FIG. 2 is a top view of the head-mounted device in FIG. 1 for being coupled to user's eyes, FIG. 3 is a rear view of the head-mounted device in FIG. 1, and FIG. 4 is a schematic view showing the usage scenario of the head-mounted device in FIG. 1.

In this embodiment, the head-mounted device 1 is configured to be worn on a user's head. The head-mounted device 1 includes a frame 101, a plurality of front camera modules 102, a display device 103, an in-display camera module 104, an image-processing unit 105, two viewing lens elements 106 and a lens actuator 107. The frame 101 may have the appearance similar to a spectacle frame so as to be easily worn on the user's head, but the present disclosure is not limited thereto. The front camera modules 102 are disposed on the frame 101, and the front camera modules 102 face outside to capture an image.

The front camera modules 102 include a first camera module 102a, a second camera module 102b and a third camera module 102c. The first camera module 102a and the second camera module 102b are respectively disposed at the left side and the right side of the frame 101 of the head-mounted device 1; or it can be considered that the first camera module 102a and the second camera module 102b are respectively disposed at two ends of the frame 101 of the head-mounted device 1. The third camera module 102c is disposed between the first camera module 102a and the second camera module 102b.

The display device 103 is disposed on the frame 101. The display device 103 displays the image captured by the front camera modules 102. In specific, the front camera modules 102 and the display device 103 are in communication connection with the image-processing unit 105, and the display device 103 can obtain the image captured by the front camera modules 102 via the image-processing unit 105 and can display the captured image. Moreover, the image-processing unit 105 is in communication connection with the front camera modules 102 and the display device 103, and the arbitrarily arranged position of the image-processing unit 105 is not intended to restrict the present disclosure. In this embodiment, the image-processing unit 105 is exemplarily disposed on the frame 101.

The in-display camera module 104 is disposed within the boundary of the display device 103; or it can be considered that the in-display camera module 104 is disposed on or inside the displaying surface (not numbered) of the display device 103. The first camera module 102a, the second camera module 102b and the third camera module 102c face a front side of the head-mounted device 1. The display device 103 and the in-display camera module 104 face a user side of the head-mounted device 1. The front side of the head-mounted device 1 is an opposite side of the user side of the head-mounted device 1.

The viewing lens elements 106 are disposed corresponding to user's eyes EYE, and the viewing lens elements 106 are disposed on a user side of the display device 103. The lens actuator 107 is coupled to the viewing lens elements 106 so as to manually move the viewing lens elements 106, and the viewing lens elements 106 can be independently moved; alternatively, the in-display camera module 104 can track the positions of the user's eyes EYE, and the in-display camera module 104 can transmit the positions to the image-processing unit 105 via the communication connection therebetween. The lens actuator 107 is, for example, in communication connection with the image-processing unit 105 to independently move the viewing lens elements 106 by a microelectromechanical or electromagnetic configuration according to the positions of the user's eyes EYE obtained from the image-processing unit 105.

Similar to wearing a pair of glasses, the head-mounted device 1 can be worn on the user's head in a manner of mounting the frame 101 on the user's head. When the head-mounted device 1 is worn at the suitable position, the display device 103 will be located within the sight of the user's eyes EYE, and the in-display camera module 104 will face the user's eyes EYE. Moreover, the lens actuator 107 can provide a manual focus adjustment manner to move the viewing lens elements 106 through a feedback of image clarity on the display device 103; alternatively, the lens actuator 107 can move the viewing lens elements 106 to the front of the user's eyes EYE according to the positions of the user's eyes EYE tracked by the in-display camera module 104. The first camera module 102a, the second camera module 102b and the third camera module 102c capture an image of an object (not shown) in front of the user and then transmit the image to the display device 103 via the image-processing unit 105. The display device 103 can display the image IMG thereon, and then the displayed image IMG can be transmitted and focused at the user's eyes EYE via the viewing lens elements 106. The user can observe a virtual image VTI of the image IMG at a side of the viewing lens elements 106 that is opposite to the user's eyes EYE and has a focus F illustrated in FIG. 4.

2nd Embodiment

Figure 5:
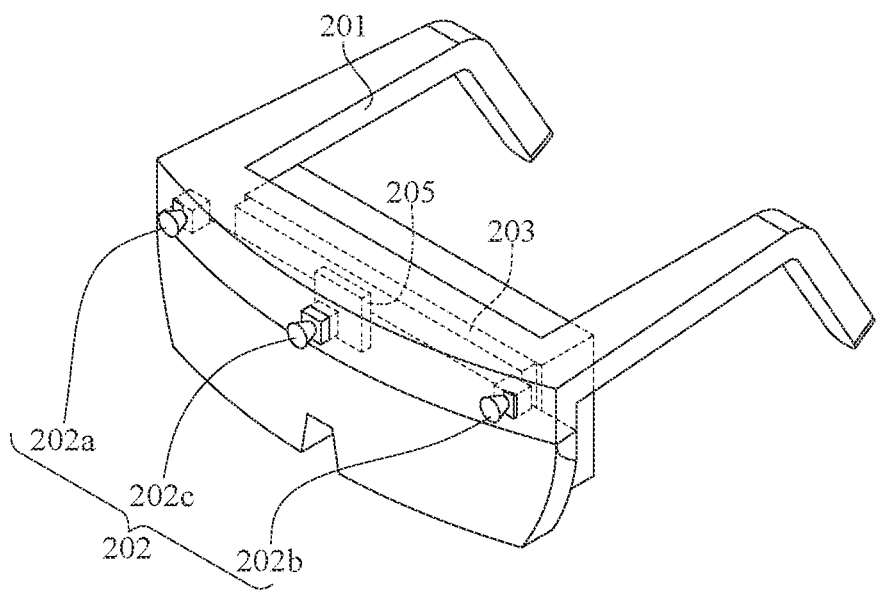
FIG. 5 is a perspective view of a head-mounted device according to the 2nd embodiment of the present disclosure.

Please refer to FIG. 5, which is a perspective view of a head-mounted device according to the 2nd embodiment of the present disclosure. Note that only the differences from the preceding embodiment are described hereinafter.

In this embodiment, the head-mounted device 2 is configured to be worn on a user's head. The head-mounted device 2 includes a frame 201, a plurality of front camera modules 202, a display device 203 and an image-processing unit 205. The frame 201 may have the appearance similar to a spectacle frame so as to be easily worn on the user's head. The front camera modules 202 are disposed on the frame 201, and the front camera modules 202 face outside to capture an image.

The front camera modules 202 include a first camera module 202a, a second camera module 202b and a third camera module 202c. The first camera module 202a and the second camera module 202b are respectively disposed at the left side and the right side of the frame 201 of the head-mounted device 2; or it can be considered that the first camera module 202a and the second camera module 202b are respectively disposed at two ends of the frame 201 of the head-mounted device 2. The third camera module 202c is disposed between the first camera module 202a and the second camera module 202b.

A maximum field of view of the third camera module 202c is smaller than a maximum field of view of the first camera module 202a and a maximum field of view of the second camera module 202b. In specific, the first camera module 202a and the second camera module 202b are ultra-wide-angle camera modules, and the maximum field of view of the first camera module 202a and the maximum field of view of the second camera module 202b are 120 degrees. The third camera module 202c is a telephoto camera module, and the maximum field of view of the third camera module 202c is 45 degrees. The user can switch to the third camera module 202c to enable a zoom function for capturing an image from afar.

The display device 203 is disposed on the frame 201. The display device 203 is in communication connection with the image-processing unit 205 and in indirect communication connection with the front camera modules 202 via the image-processing unit 205. The first camera module 202a, the second camera module 202b and the third camera module 202c face a front side of the head-mounted device 2. The display device 203 faces a user side of the head-mounted device 2 which is opposite to the front side of the head-mounted device 2 so as to display the image captured by the front camera modules 202 to the user's eyes. Moreover, the image-processing unit 205 is exemplarily disposed on the frame 201.

Similar to wearing a pair of glasses, the head-mounted device 2 can be worn on the user's head in a manner of mounting the frame 201 on the user's head. When the head-mounted device 2 is worn at the suitable position, the display device 203 will be located within the sight of the user's eyes. The first camera module 202a, the second camera module 202b and the third camera module 202c capture an image of an object in front of the user and then transmit the image to the display device 203 via the image-processing unit 205. The display device 203 can display the image thereon, and then the displayed image can be transmitted and focused at the user's eyes. The user can observe a virtual image of the image at a side of the display device 203 that is opposite to the user's eyes.

3rd Embodiment

Figure 6:
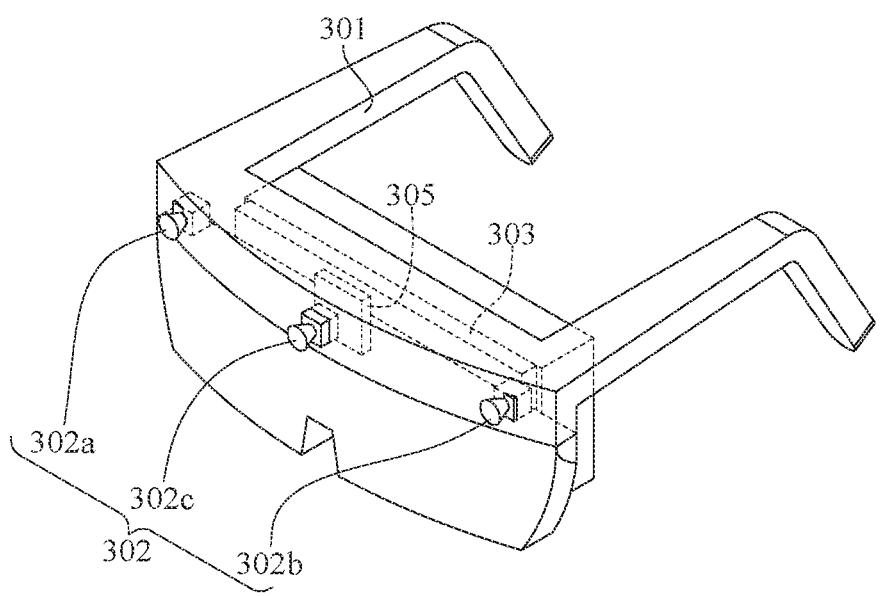
FIG. 6 is a perspective view of a head-mounted device according to the 3rd embodiment of the present disclosure.

Please refer to FIG. 6, which is a perspective view of a head-mounted device according to the 3rd embodiment of the present disclosure. Note that only the differences from the preceding embodiments are described hereinafter.

In this embodiment, the head-mounted device 3 is configured to be worn on a user's head. The head-mounted device 3 includes a frame 301, a plurality of front camera modules 302, a display device 303 and an image-processing unit 305. The frame 301 may have the appearance similar to a spectacle frame so as to be easily worn on the user's head. The front camera modules 302 are disposed on the frame 301, and the front camera modules 302 face outside to capture an image.

The front camera modules 302 include a first camera module 302a, a second camera module 302b and a third camera module 302c. The first camera module 302a and the second camera module 302b are respectively disposed at the left side and the right side of the frame 301 of the head-mounted device 3; or it can be considered that the first camera module 302a and the second camera module 302b are respectively disposed at two ends of the frame 301 of the head-mounted device 3. The third camera module 302c is disposed between the first camera module 302a and the second camera module 302b.

A maximum field of view of the third camera module 302c is smaller than a maximum field of view of the first camera module 302a and a maximum field of view of the second camera module 302b, and the maximum field of view of the second camera module 302b ranges between the maximum field of view of the first camera module 302a and the maximum field of view of the third camera module 302c. In specific, the first camera module 302a is an ultra-wide-angle camera module, and the maximum field of view of the first camera module 302a is 120 degrees. The second camera module 302b is a wide-angle camera module, and the maximum field of view of the second camera module 302b is 80 degrees. The third camera module 302c is a telephoto camera module, and the maximum field of view of the third camera module 302c is 30 degrees. The user can switch between the first camera module 302a, the second camera module 302b and the third camera module 302c to enable a two-stage zoom function for capturing an image from afar or from a large field of view.

The display device 303 is disposed on the frame 301. The display device 303 is in communication connection with the image-processing unit 305 and in indirect communication connection with the front camera modules 302 via the image-processing unit 305. The first camera module 302a, the second camera module 302b and the third camera module 302c face a front side of the head-mounted device 3. The display device 303 faces a user side of the head-mounted device 3 which is opposite to the front side of the head-mounted device 3 so as to display the image captured by the front camera modules 302 to the user's eyes. Moreover, the image-processing unit 305 is exemplarily disposed on the frame 301.

Similar to wearing a pair of glasses, the head-mounted device 3 can be worn on the user's head in a manner of mounting the frame 301 on the user's head. When the head-mounted device 3 is worn at the suitable position, the display device 303 will be located within the sight of the user's eyes. The first camera module 302a, the second camera module 302b and the third camera module 302c capture an image of an object in front of the user and then transmit the image to the display device 303 via the image-processing unit 305. The display device 303 can display the image thereon, and then the displayed image can be transmitted and focused at the user's eyes. The user can observe a virtual image of the image at a side of the display device 303 that is opposite to the user's eyes.

4th Embodiment

Figure 7:
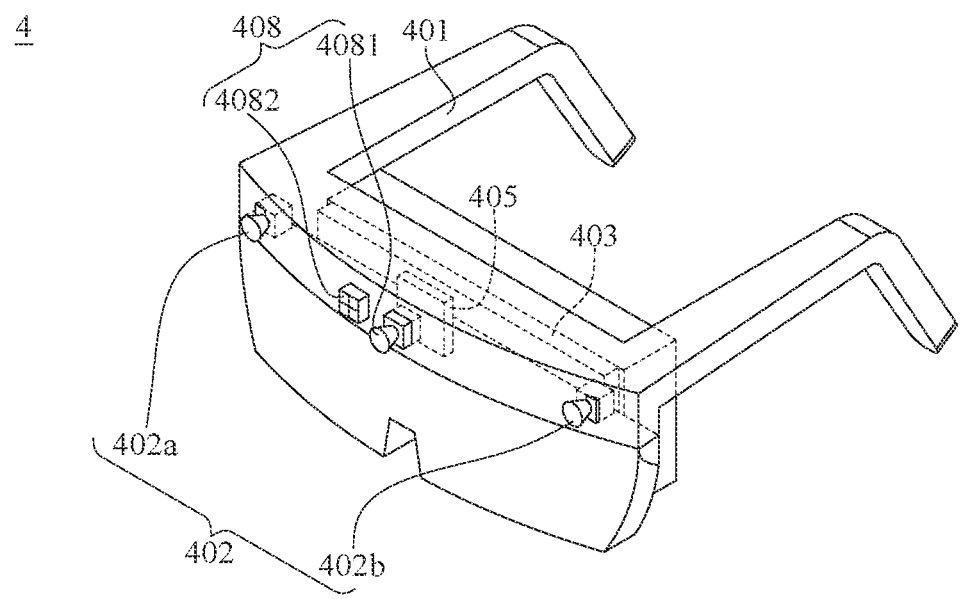
FIG. 7 is a perspective view of a head-mounted device according to the 4th embodiment of the present disclosure.

Please refer to FIG. 7, which is a perspective view of a head-mounted device according to the 4th embodiment of the present disclosure. Note that only the differences from the preceding embodiments are described hereinafter.

In this embodiment, the head-mounted device 4 is configured to be worn on a user's head. The head-mounted device 4 includes a frame 401, a plurality of front camera modules 402, a display device 403, an image-processing unit 405 and an infrared depth sensing module 408. The frame 401 may have the appearance similar to a spectacle frame so as to be easily worn on the user's head. The front camera modules 402 are disposed on the frame 401. The front camera modules 402 face outside to capture an image, and the front camera modules 402 are in communication connection with the image-processing unit 405 so as to transmit the captured image to the image-processing unit 405.

The front camera modules 402 include a first camera module 402a and a second camera module 402b. The first camera module 402a and the second camera module 402b are respectively disposed at the left side and the right side of the frame 401 of the head-mounted device 4; or it can be considered that the first camera module 402a and the second camera module 402b are respectively disposed at two ends of the frame 401 of the head-mounted device 4.

The display device 403 is disposed on the frame 401. The display device 403 is in communication connection with the image-processing unit 405. The first camera module 402a and the second camera module 402b face a front side of the head-mounted device 4. The display device 403 faces a user side of the head-mounted device 4 which is opposite to the front side of the head-mounted device 4 so as to display the image processed by the image-processing unit 405 to the user's eyes. Moreover, the image-processing unit 405 is exemplarily disposed on the frame 401.

The infrared depth sensing module 408 is disposed on the frame 401 and is located between the first camera module 402a and the second camera module 402b. The infrared depth sensing module 408 is a time-of-flight (ToF) module and includes an infrared camera module 4081 (receiver) and an infrared illuminator 4082 (emitter). The infrared illuminator 4082 of the ToF module can use a pulsed light module or a non-pulsed light module. The infrared depth sensing module 408 can also use a structured light module to provide a depth sensing function. The infrared depth sensing module 408 can be in communication connection with the image-processing unit 405, and the image-processing unit 405 can combine the captured image data transmitted from the front camera modules 402 with the depth data transmitted from the infrared depth sensing module 408 to obtain a final image, and then the image-processing unit 405 can transmit the final image to the display device 403.

Similar to wearing a pair of glasses, the head-mounted device 4 can be worn on the user's head in a manner of mounting the frame 401 on the user's head. When the head-mounted device 4 is worn at the suitable position, the display device 403 will be located within the sight of the user's eyes. The first camera module 402a and the second camera module 402b capture an image of an object in front of the user and then transmit the image to the image-processing unit 405. The infrared depth sensing module 408 detects and obtains a 3D image depth data of the object in front of the user through the infrared camera module 4081 and the infrared illuminator 4082, and then the infrared depth sensing module 408 transmits the depth data to the image-processing unit 405. The image-processing unit 405 combines the captured image with the depth data to obtain a final image, and the image-processing unit 405 transmits the final image to the display device 403. The display device 403 can display the final image with the depth data thereon, which is then focused at the user's eyes. The user can observe a virtual image of the final image at a side of the display device 403 that is opposite to the user's eyes.

5th Embodiment

Figure 8:
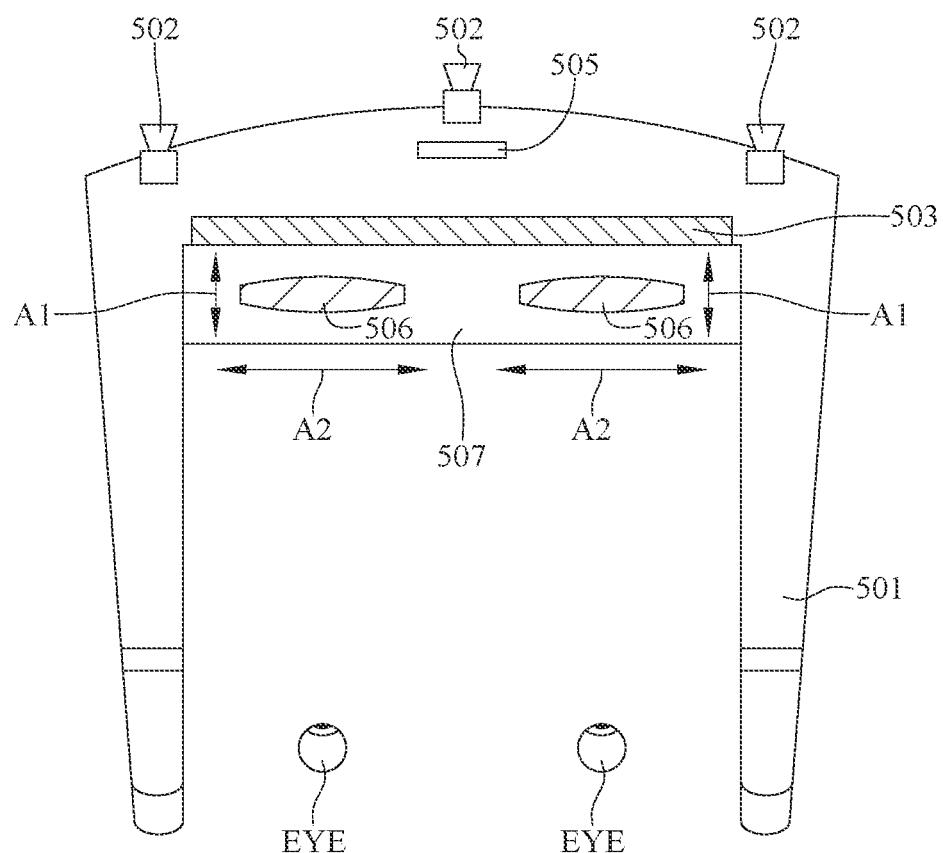
FIG. 8 is a top view of a head-mounted device according to the 5th embodiment of the present disclosure for being coupled to user's eyes.
Figure 9:
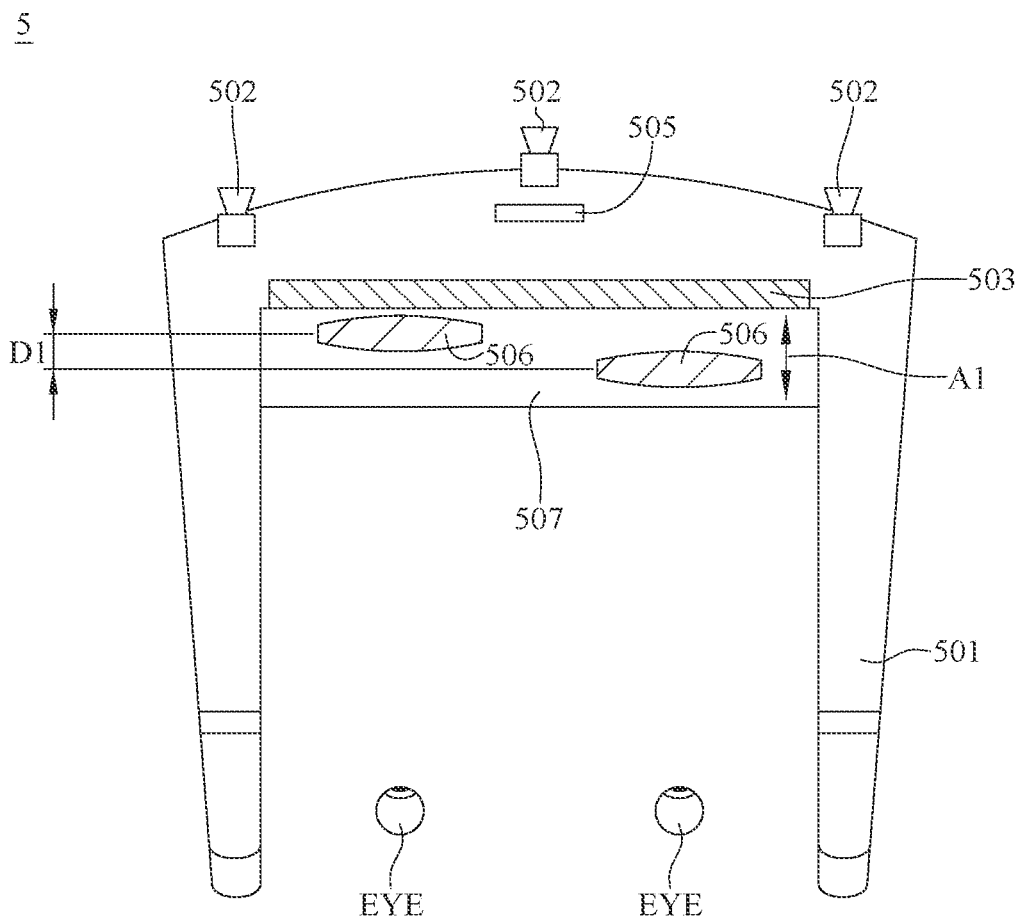
FIG. 9 is a top view showing a manner of adjusting the position of viewing lens elements of the head-mounted device in FIG. 8.
Figure 10:
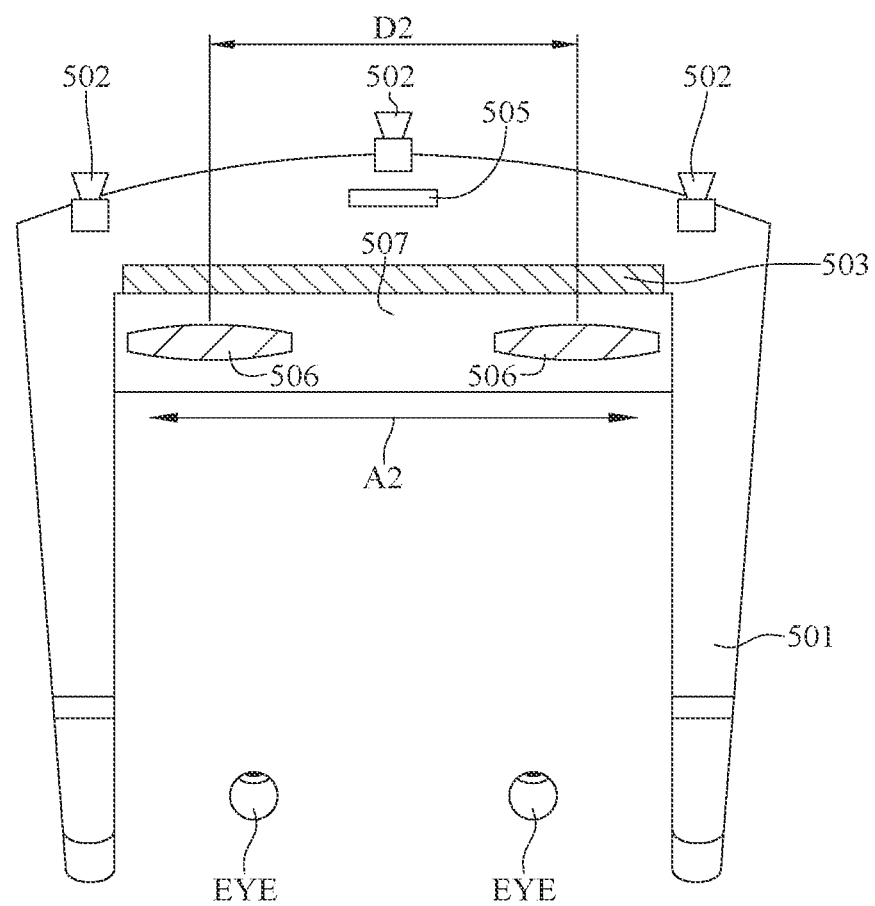
FIG. 10 is a top view showing another manner of adjusting the position of viewing lens elements of the head-mounted device in FIG. 8.

Please refer to FIG. 8 to FIG. 10, where FIG. 8 is a top view of a head-mounted device according to the 5th embodiment of the present disclosure for being coupled to user's eyes, FIG. 9 is a top view showing a manner of adjusting the position of viewing lens elements of the head-mounted device in FIG. 8, and FIG. 10 is a top view showing another manner of adjusting the position of viewing lens elements of the head-mounted device in FIG. 8. Note that only the differences from the preceding embodiments are described hereinafter.

In this embodiment, the head-mounted device 5 is configured to be worn on a user's head. The head-mounted device 5 includes a frame 501, a plurality of front camera modules 502, a display device 503, an image-processing unit 505, two viewing lens elements 506 and a lens actuator 507. The frame 501 may have the appearance similar to a spectacle frame so as to be easily worn on the user's head. The front camera modules 502 are disposed on the frame 501, and the front camera modules 502 face outside to capture an image.

The display device 503 is disposed on the frame 501. The display device 503 is in communication connection with the image-processing unit 505 and in indirect communication connection with the front camera modules 502 via the image-processing unit 505. The front camera modules 502 face a front side of the head-mounted device 5. The display device 503 faces a user side of the head-mounted device 5 which is opposite to the front side of the head-mounted device 5 so as to display the image captured by the front camera modules 502 to the user's eyes EYE. Moreover, the image-processing unit 505 is exemplarily disposed on the frame 501.

The viewing lens elements 506 are disposed corresponding to the user's eyes EYE, and the viewing lens elements 506 are disposed on a user side of the display device 503. The lens actuator 507 is coupled to the viewing lens elements 506 so as to manually move the viewing lens elements 506 through a knob or a dial (not shown), and the viewing lens elements 506 can be independently moved; alternatively, the lens actuator 507 can independently move the viewing lens elements 506 by a microelectromechanical or electromagnetic configuration according to the positions of the user's eyes EYE. The viewing lens elements 506 are movable by the lens actuator 507 along a first axis A1 and a second axis A2. As shown in FIG. 9, the viewing lens elements 506 are independently moved by the lens actuator 507 according to the different focal distances of the user's eyes EYE; one of the viewing lens elements 506 is moved close to the user's eyes EYE, and the other one is moved away from the user's eyes EYE, wherein D1 denoted in FIG. 9 represents a difference between the viewing lens elements 506 along the first axis A1. As shown in FIG. 10, the interpupillary distance of the viewing lens elements 506 is adjusted by the lens actuator 507 according to the distance between the user's eyes EYE, wherein D2 denoted in FIG. 10 represents a difference between the viewing lens elements 506 along the second axis A2.

Similar to wearing a pair of glasses, the head-mounted device 5 can be worn on the user's head in a manner of mounting the frame 501 on the user's head. When the head-mounted device 5 is worn at the suitable position, the display device 503 will be located within the sight of the user's eyes EYE. Moreover, the lens actuator 507 can provide a manual focus adjustment manner to move the viewing lens elements 506 through a feedback of image clarity on the display device 503; alternatively, the lens actuator 507 can move the viewing lens elements 506 to a suitable position for the user's eyes EYE according to the condition of the user's eyes EYE, and the focal distances and the interpupillary distance of the user's eyes EYE will be recorded in the lens actuator 507 so as to quickly adjust the positions of the viewing lens elements 506 in the next use. The front camera modules 502 capture an image of an object in front of the user and then transmit the image to the display device 503 via the image-processing unit 505. The display device 503 can display the image thereon, and then the displayed image can be transmitted and focused at the user's eyes EYE via the viewing lens elements 506. The user can observe a virtual image of the image at a side of the viewing lens elements 506 that is opposite to the user's eyes EYE.

6th Embodiment

Figure 11:
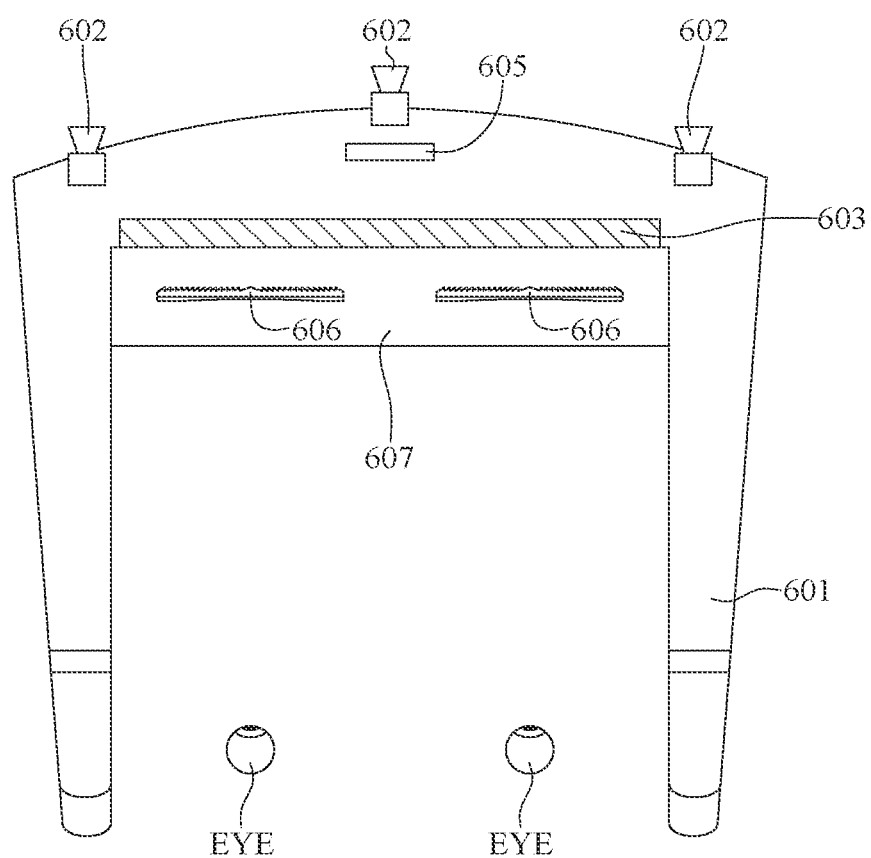
FIG. 11 is a top view of a head-mounted device according to the 6th embodiment of the present disclosure for being coupled to user's eyes.

Please refer to FIG. 11, which is a top view of a head-mounted device according to the 6th embodiment of the present disclosure for being coupled to user's eyes. Note that only the differences from the preceding embodiments are described hereinafter.

In this embodiment, the head-mounted device 6 is configured to be worn on a user's head. The head-mounted device 6 includes a frame 601, a plurality of front camera modules 602, a display device 603, an image-processing unit 605, two viewing lens elements 606 and a lens actuator 607. The frame 601 may have the appearance similar to a spectacle frame so as to be easily worn on the user's head.

The front camera modules 602 are disposed on the frame 601, and the front camera modules 602 face outside to capture an image.

The display device 603 is disposed on the frame 601. The display device 603 is in communication connection with the image-processing unit 605 and in indirect communication connection with the front camera modules 602 via the image-processing unit 605. The front camera modules 602 face a front side of the head-mounted device 6. The display device 603 faces a user side of the head-mounted device 6 which is opposite to the front side of the head-mounted device 6 so as to display the image captured by the front camera modules 602 to the user's eyes EYE. Moreover, the image-processing unit 605 is exemplarily disposed on the frame 601.

The viewing lens elements 606 include two diffraction lens elements. In specific, the viewing lens elements 606 include two Fresnel lens elements respectively disposed on the left side and the right side of the head-mounted device 6. The viewing lens elements 606 are disposed corresponding to the user's eyes EYE, and the viewing lens elements 606 are disposed on a user side of the display device 603. The lens actuator 607 is coupled to the viewing lens elements 606 so as to manually move the viewing lens elements 606, and the viewing lens elements 606 can be independently moved; alternatively, the lens actuator 607 can independently move the viewing lens elements 606 by a microelectromechanical or electromagnetic configuration according to the positions of the user's eyes EYE.

Similar to wearing a pair of glasses, the head-mounted device 6 can be worn on the user's head in a manner of mounting the frame 601 on the user's head. When the head-mounted device 6 is worn at the suitable position, the display device 603 will be located within the sight of the user's eyes EYE. Moreover, the lens actuator 607 can provide a manual focus adjustment manner to move the viewing lens elements 606 through a feedback of image clarity on the display device 603; alternatively, the lens actuator 607 can move the viewing lens elements 606 to the front of the user's eyes EYE according to the positions of the user's eyes EYE. The front camera modules 602 capture an image of an object in front of the user and then transmit the image to the display device 603 via the image-processing unit 605. The display device 603 can display the image thereon, and then the displayed image can be transmitted and focused at the user's eyes EYE via the viewing lens elements 606. The user can observe a virtual image of the image at a side of the viewing lens elements 606 that is opposite to the user's eyes EYE.

7th Embodiment

Figure 12:
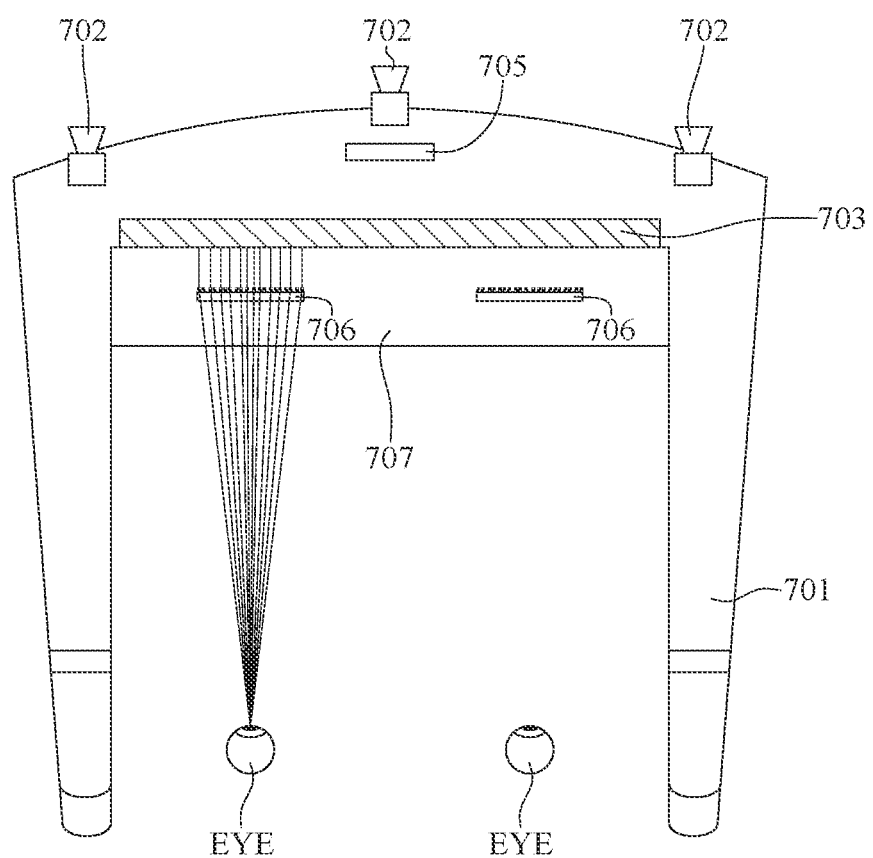
FIG. 12 is a top view of a head-mounted device according to the 7th embodiment of the present disclosure for being coupled to user's eyes.

Please refer to FIG. 12, which is a top view of a head-mounted device according to the 7th embodiment of the present disclosure for being coupled to user's eyes. Note that only the differences from the preceding embodiments are described hereinafter.

In this embodiment, the head-mounted device 7 is configured to be worn on a user's head. The head-mounted device 7 includes a frame 701, a plurality of front camera modules 702, a display device 703, an image-processing unit 705, two viewing lens elements 706 and a lens actuator 707. The frame 701 may have the appearance similar to a spectacle frame so as to be easily worn on the user's head. The front camera modules 702 are disposed on the frame 701, and the front camera modules 702 face outside to capture an image.

The display device 703 is disposed on the frame 701. The display device 703 is in communication connection with the image-processing unit 705 and in indirect communication connection with the front camera modules 702 via the image-processing unit 705. The front camera modules 702 face a front side of the head-mounted device 7. The display device 703 faces a user side of the head-mounted device 7 which is opposite to the front side of the head-mounted device 7 so as to display the image captured by the front camera modules 702 to the user's eyes EYE. Moreover, the image-processing unit 705 is exemplarily disposed on the frame 701.

The viewing lens elements 706 include two metalens elements that are respectively disposed on the left side and the right side of the head-mounted device 7 and have metasurfaces facing the display device 703. The viewing lens elements 706 are disposed corresponding to the user's eyes EYE, and the viewing lens elements 706 are disposed on a user side of the display device 703. The lens actuator 707 is coupled to the viewing lens elements 706 so as to manually move the viewing lens elements 706, and the viewing lens elements 706 can be independently moved; alternatively, the lens actuator 707 can independently move the viewing lens elements 706 by a microelectromechanical or electromagnetic configuration according to the positions of the user's eyes EYE.

Similar to wearing a pair of glasses, the head-mounted device 7 can be worn on the user's head in a manner of mounting the frame 701 on the user's head. When the head-mounted device 7 is worn at the suitable position, the display device 703 will be located within the sight of the user's eyes EYE. Moreover, the lens actuator 707 can provide a manual focus adjustment manner to move the viewing lens elements 706 through a feedback of image clarity on the display device 703; alternatively, the lens actuator 707 can move the viewing lens elements 706 to the front of the user's eyes EYE according to the positions of the user's eyes EYE. The front camera modules 702 capture an image of an object in front of the user and then transmit the image to the display device 703 via the image-processing unit 705. The display device 703 can display the image thereon, and then the displayed image can be transmitted and focused at the user's eyes EYE via the viewing lens elements 706. The user can observe a virtual image of the image at a side of the viewing lens elements 706 that is opposite to the user's eyes EYE.

8th Embodiment

Figure 13:
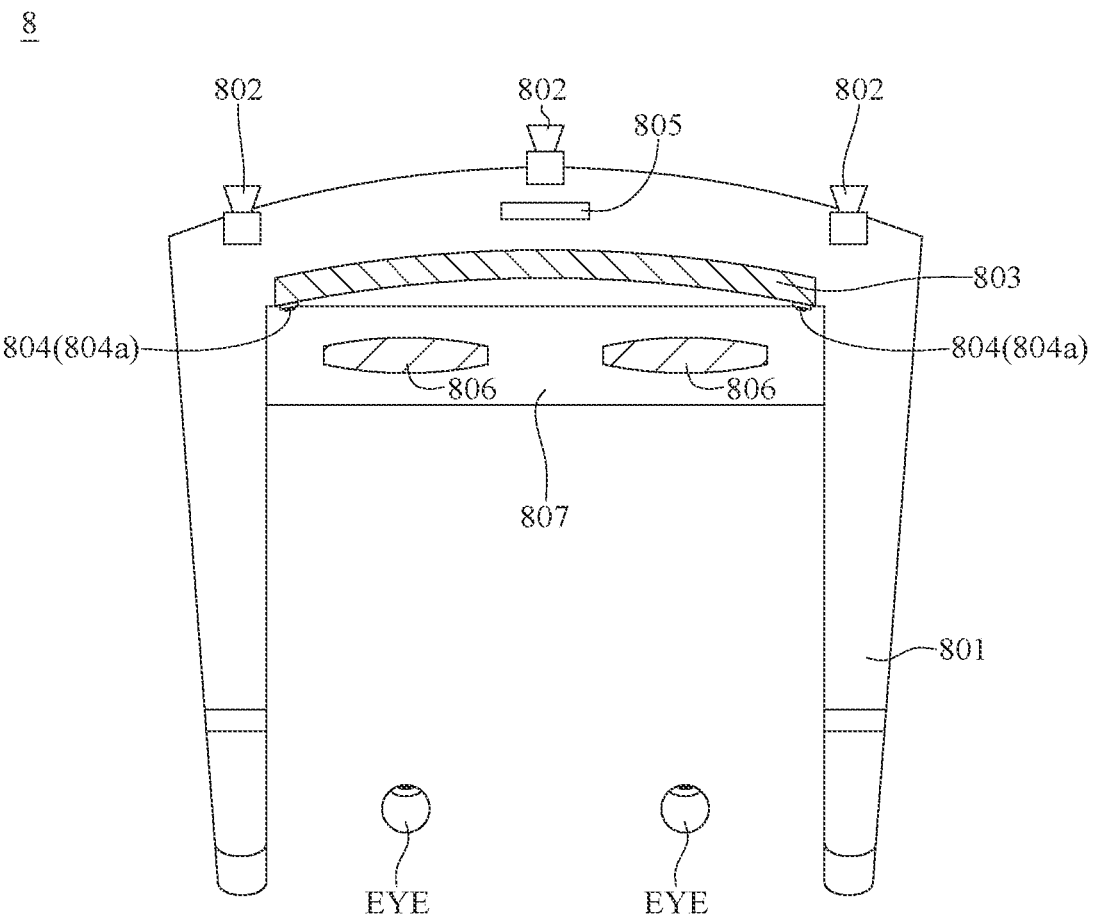
FIG. 13 is a top view of a head-mounted device according to the 8th embodiment of the present disclosure for being coupled to user's eyes.

Please refer to FIG. 13, which is a top view of a head-mounted device according to the 8th embodiment of the present disclosure for being coupled to user's eyes. Note that only the differences from the preceding embodiments are described hereinafter.

In this embodiment, the head-mounted device 8 is configured to be worn on a user's head. The head-mounted device 8 includes a frame 801, a plurality of front camera modules 802, a display device 803, two in-display camera modules 804, an image-processing unit 805, two viewing lens elements 806 and a lens actuator 807. The frame 801 may have the appearance similar to a spectacle frame so as to be easily worn on the user's head. The front camera modules 802 are disposed on the frame 801, and the front camera modules 802 face outside to capture an image.

The display device 803 is disposed on the frame 801. The display device 803 is in communication connection with the image-processing unit 805 and in indirect communication connection with the front camera modules 802 via the image-processing unit 805. The display device 803 includes a curved screen (not numbered) so as to display the image captured by the front camera modules 802 as providing an immersive experience. Moreover, the image-processing unit 805 is exemplarily disposed on the frame 801.

The in-display camera modules 804 are respectively disposed at the left side and the right side within the boundary of the display device 803; or it can be considered that the in-display camera modules 804 are respectively disposed at the left side and the right side on the displaying surface (not numbered) of the display device 803. The front camera modules 802 face a front side of the head-mounted device 8. The display device 803 and the in-display camera modules 804 face a user side of the head-mounted device 8. The front side of the head-mounted device 8 is an opposite side of the user side of the head-mounted device 8.

The in-display camera modules 804 include two inside cameras 804a. The inside cameras 804a include two eye tracking cameras respectively disposed at two ends of the display device 803.

The viewing lens elements 806 are disposed corresponding to the user's eyes EYE, and the viewing lens elements 806 are disposed on a user side of the display device 803. The lens actuator 807 is coupled to the viewing lens elements 806 so as to manually move the viewing lens elements 806, and the viewing lens elements 806 can be independently moved; alternatively, the in-display camera modules 804 can track the positions of the user's eyes EYE, and the in-display camera modules 804 can transmit the positions to the image-processing unit 805 via the communication connection therebetween. The lens actuator 807 is, for example, in communication connection with the image-processing unit 805 to independently move the viewing lens elements 806 by a microelectromechanical or electromagnetic configuration according to the positions of the user's eyes EYE obtained from the image-processing unit 805.

Similar to wearing a pair of glasses, the head-mounted device 8 can be worn on the user's head in a manner of mounting the frame 801 on the user's head. When the head-mounted device 8 is worn at the suitable position, the display device 803 will be located within the sight of the user's eyes EYE, and the in-display camera modules 804 will face the user's eyes EYE. Moreover, the lens actuator 807 can provide a manual focus adjustment manner to move the viewing lens elements 806 through a feedback of image clarity on the display device 803; alternatively, the lens actuator 807 can move the viewing lens elements 806 to the front of the user's eyes EYE according to the positions of the user's eyes EYE tracked by the in-display camera modules 804. The front camera modules 802 capture an image of an object in front of the user and then transmit the image to the display device 803 via the image-processing unit 805. The display device 803 can display the image thereon as providing an immersive experience, and then the displayed image can be transmitted and focused at the user's eyes EYE via the viewing lens elements 806. The user can observe a virtual image of the image at a side of the viewing lens elements 806 that is opposite to the user's eyes EYE.

9th Embodiment

Figure 14:
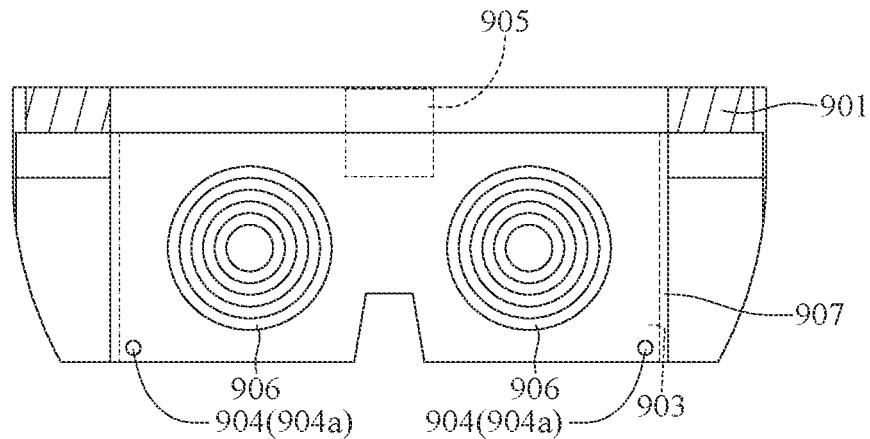
FIG. 14 is a rear view of a head-mounted device according to the 9th embodiment of the present disclosure.

Please refer to FIG. 14, which is a rear view of a head-mounted device according to the 9th embodiment of the present disclosure. Note that only the differences from the preceding embodiment are described hereinafter.

In this embodiment, the head-mounted device 9 is configured to be worn on a user's head. The head-mounted device 9 includes a frame 901, a display device 903, two in-display camera modules 904, an image-processing unit 905, two viewing lens elements 906 and a lens actuator 907. The frame 901 may have the appearance similar to a spectacle frame so as to be easily worn on the user's head.

The display device 903 is disposed on the frame 901. The display device 903 is configured to display an image from outside, and the display device 903 is in communication connection with the image-processing unit 905. Moreover, the image-processing unit 905 is exemplarily disposed on the frame 901.

The in-display camera modules 904 are disposed within the boundary of the display device 903; or it can be considered that the in-display camera modules 904 are disposed on the displaying surface (not numbered) of the display device 903. The display device 903 and the in-display camera modules 904 face a user side of the head-mounted device 9 which is an opposite side of a front side of the head-mounted device 9.

The in-display camera modules 904 include two inside cameras 904a. The inside cameras 904a are respectively disposed at two ends of the display device 903. In specific, the inside cameras 904a include two hole-punch camera modules symmetrically disposed at the left and right sides of the lower portion of the displaying surface of the display device 903.

The viewing lens elements 906 are disposed corresponding to the user's eyes, and the viewing lens elements 906 are disposed on a user side of the display device 903. The lens actuator 907 is coupled to the viewing lens elements 906 so as to manually move the viewing lens elements 906, and the viewing lens elements 906 can be independently moved; alternatively, the in-display camera module 904 can track the positions of the user's eyes, and the in-display camera module 904 can transmit the positions to the image-processing unit 905 via the communication connection therebetween. The lens actuator 907 is, for example, in communication connection with the image-processing unit 905 to independently move the viewing lens elements 906 by a microelectromechanical or electromagnetic configuration according to the positions of the user's eyes obtained from the image-processing unit 905.

Similar to wearing a pair of glasses, the head-mounted device 9 can be worn on the user's head in a manner of mounting the frame 901 on the user's head. When the head-mounted device 9 is worn at the suitable position, the display device 903 will be located within the sight of the user's eyes, and the in-display camera module 904 will face the user's eyes. Moreover, the lens actuator 907 can provide a manual focus adjustment manner to move the viewing lens elements 906 through a feedback of image clarity on the display device 903; alternatively, the lens actuator 907 can move the viewing lens elements 906 to the front of the user's eyes according to the positions of the user's eyes tracked by the in-display camera module 904. The display device 903 can display an image of an object in front of the user thereon, and then the displayed image can be transmitted and focused at the user's eyes via the viewing lens elements 906. The user can observe a virtual image of the image at a side of the viewing lens elements 906 that is opposite to the user's eyes.

10th Embodiment

Figure 15:
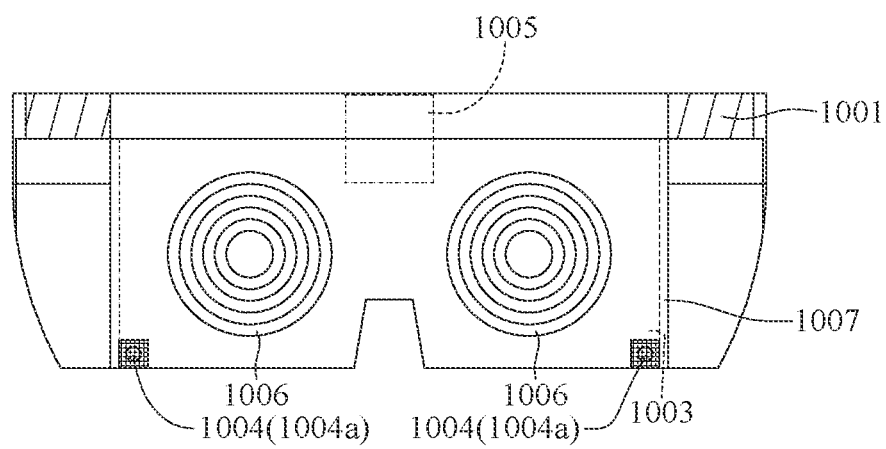
FIG. 15 is a rear view of a head-mounted device according to the 10th embodiment of the present disclosure.

Please refer to FIG. 15, which is a rear view of a head-mounted device according to the 10th embodiment of the present disclosure. Note that only the differences from the preceding embodiment are described hereinafter.

In this embodiment, the head-mounted device 10 is configured to be worn on a user's head. The head-mounted device 10 includes a frame 1001, a display device 1003, two in-display camera modules 1004, an image-processing unit 1005, two viewing lens elements 1006 and a lens actuator 1007. The frame 1001 may have the appearance similar to a spectacle frame so as to be easily worn on the user's head.

The display device 1003 is disposed on the frame 1001. The display device 1003 is configured to display an image from outside, and the display device 1003 is in communication connection with the image-processing unit 1005. Moreover, the image-processing unit 1005 is exemplarily disposed on the frame 1001.

The in-display camera modules 1004 are disposed within the boundary of the display device 1003; or it can be considered that the in-display camera modules 1004 are disposed on the displaying surface (not numbered) of the display device 1003. The display device 1003 and the in-display camera modules 1004 face a user side of the head-mounted device 10 which is an opposite side of a front side of the head-mounted device 10.

The in-display camera modules 1004 include two inside cameras 1004a. The inside cameras 1004a are respectively disposed at two ends of the display device 1003. In specific, the inside cameras 1004a include two under display camera modules symmetrically disposed at the left and right sides of the lower portion of the displaying surface of the display device 1003.

The viewing lens elements 1006 are disposed corresponding to the user's eyes, and the viewing lens elements 1006 are disposed on a user side of the display device 1003. The lens actuator 1007 is coupled to the viewing lens elements 1006 so as to manually move the viewing lens elements 1006, and the viewing lens elements 1006 can be independently moved; alternatively, the in-display camera module 1004 can track the positions of the user's eyes, and the in-display camera module 1004 can transmit the positions to the image-processing unit 1005 via the communication connection therebetween. The lens actuator 1007 is, for example, in communication connection with the image-processing unit 1005 to independently move the viewing lens elements 1006 by a microelectromechanical or electromagnetic configuration according to the positions of the user's eyes obtained from the image-processing unit 1005.

Similar to wearing a pair of glasses, the head-mounted device 10 can be worn on the user's head in a manner of mounting the frame 1001 on the user's head. When the head-mounted device 10 is worn at the suitable position, the display device 1003 will be located within the sight of the user's eyes, and the in-display camera module 1004 will face the user's eyes. Moreover, the lens actuator 1007 can provide a manual focus adjustment manner to move the viewing lens elements 1006 through a feedback of image clarity on the display device 1003; alternatively, the lens actuator 1007 can move the viewing lens elements 1006 to the front of the user's eyes according to the positions of the user's eyes tracked by the in-display camera module 1004. The display device 1003 can display an image of an object in front of the user thereon, and then the displayed image can be transmitted and focused at the user's eyes via the viewing lens elements 1006. The user can observe a virtual image of the image at a side of the viewing lens elements 1006 that is opposite to the user's eyes.

11th Embodiment

Figure 16:
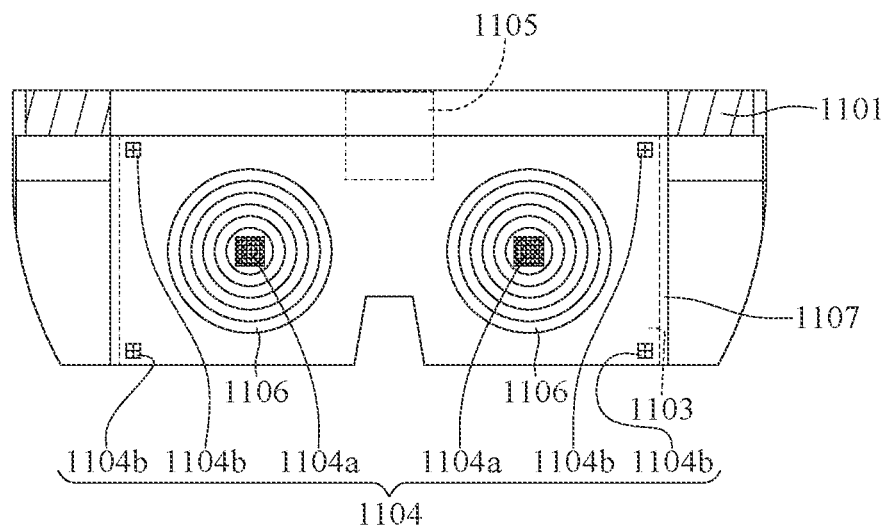
FIG. 16 is a rear view of a head-mounted device according to the 11th embodiment of the present disclosure.

Please refer to FIG. 16, which is a rear view of a head-mounted device according to the 11th embodiment of the present disclosure. Note that only the differences from the preceding embodiment are described hereinafter.

In this embodiment, the head-mounted device 11 is configured to be worn on a user's head. The head-mounted device 11 includes a frame 1101, a display device 1103, a plurality of in-display camera modules 1104, an image-processing unit 1105, two viewing lens elements 1106 and a lens actuator 1107. The frame 1101 may have the appearance similar to a spectacle frame so as to be easily worn on the user's head.

The display device 1103 is disposed on the frame 1101. The display device 1103 is configured to display an image from outside, and the display device 1103 is in communication connection with the image-processing unit 1105. Moreover, the image-processing unit 1105 is exemplarily disposed on the frame 1101.

The in-display camera modules 1104 are disposed within the boundary of the display device 1103; or it can be considered that the in-display camera modules 1104 are disposed on the displaying surface (not numbered) of the display device 1103. The display device 1103 and the in-display camera modules 1104 face a user side of the head-mounted device 11 which is an opposite side of a front side of the head-mounted device 11.

The in-display camera modules 1104 include two inside cameras 1104a and four infrared illuminators 1104b. The inside cameras 1104a include two eye tracking cameras respectively disposed near central areas of the viewing lens elements 1106 so as to be aligned with the user's eyes. The infrared illuminators 1104b are disposed at four corners of the displaying surface of the display device 1103. And, the inside cameras 1104a include two infrared camera modules in combination with the infrared illuminators 1104b to process user's eyes motion and gaze information. Moreover, the inside cameras 1104a include two under display camera modules.

The viewing lens elements 1106 are disposed corresponding to the user's eyes, and the viewing lens elements 1106 are disposed on a user side of the display device 1103. The lens actuator 1107 is coupled to the viewing lens elements 1106 so as to manually move the viewing lens elements 1106, and the viewing lens elements 1106 can be independently moved; alternatively, the in-display camera module 1104 can track the positions of the user's eyes, and the in-display camera module 1104 can transmit the positions to the image-processing unit 1105 via the communication connection therebetween. The lens actuator 1107 is, for example, in communication connection with the image-processing unit 1105 to independently move the viewing lens elements 1106 by a microelectromechanical or electromagnetic configuration according to the positions of the user's eyes obtained from the image-processing unit 1105.

Similar to wearing a pair of glasses, the head-mounted device 11 can be worn on the user's head in a manner of mounting the frame 1101 on the user's head. When the head-mounted device 11 is worn at the suitable position, the display device 1103 will be located within the sight of the user's eyes, and the in-display camera module 1104 will face the user's eyes. Moreover, the lens actuator 1107 can provide a manual focus adjustment manner to move the viewing lens elements 1106 through a feedback of image clarity on the display device 1103; alternatively, the lens actuator 1107 can move the viewing lens elements 1106 to the front of the user's eyes according to the positions of the user's eyes tracked by the in-display camera module 1104. The display device 1103 can display an image of an object in front of the user thereon, and then the displayed image can be transmitted and focused at the user's eyes via the viewing lens elements 1106. The user can observe a virtual image of the image at a side of the viewing lens elements 1106 that is opposite to the user's eyes.

12th Embodiment

Figure 17:
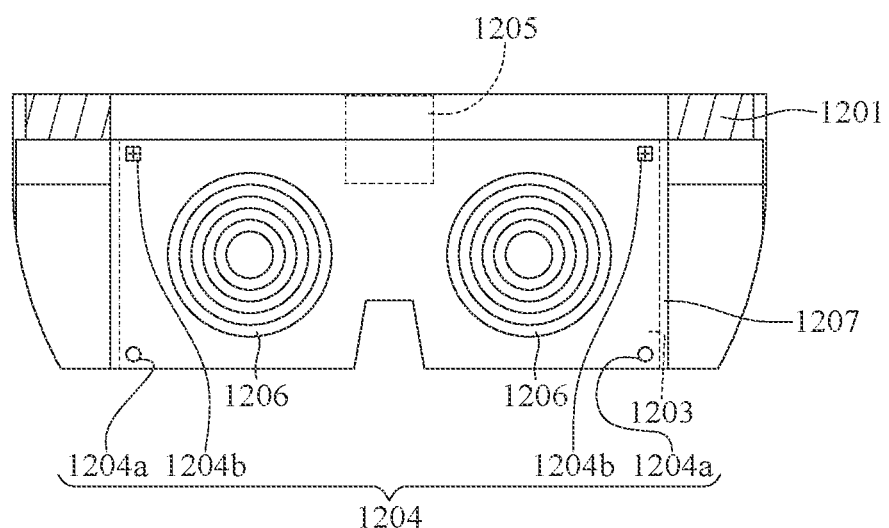
FIG. 17 is a rear view of a head-mounted device according to the 12th embodiment of the present disclosure.

Please refer to FIG. 17, which is a rear view of a head-mounted device according to the 12th embodiment of the present disclosure. Note that only the differences from the preceding embodiment are described hereinafter.

In this embodiment, the head-mounted device 12 is configured to be worn on a user's head. The head-mounted device 12 includes a frame 1201, a display device 1203, a plurality of in-display camera modules 1204, an image-processing unit 1205, two viewing lens elements 1206 and a lens actuator 1207. The frame 1201 may have the appearance similar to a spectacle frame so as to be easily worn on the user's head.

The display device 1203 is disposed on the frame 1201. The display device 1203 is configured to display an image from outside, and the display device 1203 is in communication connection with the image-processing unit 1205. Moreover, the image-processing unit 1205 is exemplarily disposed on the frame 1201.

The in-display camera modules 1204 are disposed within the boundary of the display device 1203; or it can be considered that the in-display camera modules 1204 are disposed on the displaying surface (not numbered) of the display device 1203. The display device 1203 and the in-display camera modules 1204 face a user side of the head-mounted device 12 which is an opposite side of a front side of the head-mounted device 12.

The in-display camera modules 1204 include two inside cameras 1204a and two infrared illuminators 1204b. The inside cameras 1204a are respectively disposed at two ends of the display device 1203. In specific, the inside cameras 1204a are symmetrically disposed at the left and right sides of the lower portion of the displaying surface of the display device 1203. On the other hand, the infrared illuminators 1204b are disposed at the left and right sides of the upper portion of the displaying surface of the display device 1203. And, the inside cameras 1204a include two infrared camera modules in combination with the infrared illuminators 1204b to process user's eyes motion and gaze information. Moreover, the inside cameras 1204a include two hole-punch camera modules.

The viewing lens elements 1206 are disposed corresponding to the user's eyes, and the viewing lens elements 1206 are disposed on a user side of the display device 1203. The lens actuator 1207 is coupled to the viewing lens elements 1206 so as to manually move the viewing lens elements 1206, and the viewing lens elements 1206 can be independently moved; alternatively, the in-display camera module 1204 can track the positions of the user's eyes, and the in-display camera module 1204 can transmit the positions to the image-processing unit 1205 via the communication connection therebetween. The lens actuator 1207 is, for example, in communication connection with the image-processing unit 1205 to independently move the viewing lens elements 1206 by a microelectromechanical or electromagnetic configuration according to the positions of the user's eyes obtained from the image-processing unit 1205.

Similar to wearing a pair of glasses, the head-mounted device 12 can be worn on the user's head in a manner of mounting the frame 1201 on the user's head. When the head-mounted device 12 is worn at the suitable position, the display device 1203 will be located within the sight of the user's eyes, and the in-display camera module 1204 will face the user's eyes. Moreover, the lens actuator 1207 can provide a manual focus adjustment manner to move the viewing lens elements 1206 through a feedback of image clarity on the display device 1203; alternatively, the lens actuator 1207 can move the viewing lens elements 1206 to the front of the user's eyes according to the positions of the user's eyes tracked by the in-display camera module 1204. The display device 1203 can display an image of an object in front of the user thereon, and then the displayed image can be transmitted and focused at the user's eyes via the viewing lens elements 1206. The user can observe a virtual image of the image at a side of the viewing lens elements 1206 that is opposite to the user's eyes.

13th Embodiment

Figure 18:
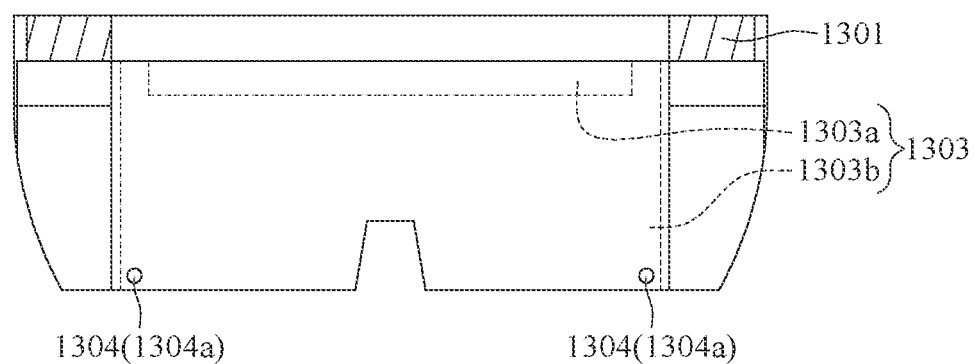
FIG. 18 is a rear view of a head-mounted device according to the 13th embodiment of the present disclosure.

Please refer to FIG. 18, which is a rear view of a head-mounted device according to the 13th embodiment of the present disclosure. Note that only the differences from the preceding embodiment are described hereinafter.

In this embodiment, the head-mounted device 13 is configured to be worn on a user's head. The head-mounted device 13 includes a frame 1301, a display device 1303 and two in-display camera modules 1304. The frame 1301 may have the appearance similar to a spectacle frame so as to be easily worn on the user's head.

The display device 1303 is disposed on the frame 1301. The display device 1303 includes an image projection module 1303a and a light-passable display device 1303b. The image projection module 1303a is able to project an image on the light-passable display device 1303b, and the light-passable display device 1303b is semitransparent so as to display a combined image of an image projected by the image projection module 1303a and an image from outside transmitted via the light-passable display device 1303b.

The in-display camera modules 1304 are disposed within the boundary of the display device 1303; or it can be considered that the in-display camera modules 1304 are disposed on the displaying surface (not numbered) of the display device 1303. The display device 1303 and the in-display camera modules 1304 face a user side of the head-mounted device 13 which is an opposite side of a front side of the head-mounted device 13.

The in-display camera modules 1304 include two inside cameras 1304a. The inside cameras 1304a are respectively disposed at two ends of the display device 1303. In specific, the inside cameras 1304a include two hole-punch camera modules symmetrically disposed at the left and right sides of the lower portion of the displaying surface of the display device 1303.

Similar to wearing a pair of glasses, the head-mounted device 13 can be worn on the user's head in a manner of mounting the frame 1301 on the user's head. When the head-mounted device 13 is worn at the suitable position, the display device 1303 will be located within the sight of the user's eyes, and the in-display camera module 1304 will face the user's eyes. The image projection module 1303a of the display device 1303 can project an image in front of the user's eyes according to the positions of the user's eyes tracked by the in-display camera module 1304. The display device 1303 can display the projected image combined with an outside image and transmitted via the light-passable display device 1303b, and then the displayed image can be focused at the user's eyes.

According to the head-mounted device discussed above, by arranging the in-display camera module within the boundary of the display device, the overall size of the head-mounted device disclosed in the abovementioned embodiments can thus be reduced, which is different from a conventional head-mounted device in which an inside camera is usually disposed out of the display device for facing user's eyes. Further, by arranging the display device and the in-display camera module to face the user's eyes, the eye tracking effect of the head-mounted device disclosed in the abovementioned embodiments can thus be enhanced, which is favorable for omitting an additional optical reflective element redirecting captured eyes images to the inside camera thereof.

Note that the communication connection described in the specification refers a connection manner for exchanging signals between two components via, for example, wired transmission or wireless transmission.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A head-mounted device, comprising:
   a plurality of front camera modules, comprising a first camera module and a second camera module respectively disposed at a left side and a right side of the head-mounted device;
   a display device;
   an in-display camera module, disposed within a boundary of the display device; and
   an image-processing unit, being in communication connection with the plurality of front camera modules and the display device;
   wherein the first camera module and the second camera module face a front side of the head-mounted device, the display device and the in-display camera module face a user side of the head-mounted device, the front side of the head-mounted device is an opposite side of the user side of the head-mounted device, and the in-display camera module comprises two inside cameras and two infrared illuminators which are disposed on or inside a displaying surface of the display device;
   wherein the two inside cameras of the in-display camera module are respectively disposed at a lower left side and a lower right side of the displaying surface, and the two infrared illuminators of the in-display camera module are respectively disposed at an upper left side and an upper right side of the displaying surface.

2. The head-mounted device according to claim 1, further comprising two viewing lens elements disposed on a user side of the display device.

3. The head-mounted device according to claim 2, wherein the plurality of front camera modules further comprising a third camera module disposed between the first camera module and the second camera module, and a maximum field of view of the third camera module is smaller than a maximum field of view of the first camera module and a maximum field of view of the second camera module.

4. The head-mounted device according to claim 3, wherein the maximum field of view of the first camera module is larger than 100 degrees, and the maximum field of view of the third camera module is smaller than 50 degrees.

5. The head-mounted device according to claim 4, wherein the maximum field of view of the second camera module ranges between the maximum field of view of the first camera module and the maximum field of view of the third camera module.

6. The head-mounted device according to claim 2, wherein the display device is configured to display images captured by the plurality of front camera modules.

7. The head-mounted device according to claim 2, further comprising a lens actuator coupled to the viewing lens elements, and the viewing lens elements are independently movable by the lens actuator.

8. The head-mounted device according to claim 7, wherein the viewing lens elements are movable by the lens actuator along at least two axes.

9. The head-mounted device according to claim 2, wherein the viewing lens elements comprise two Fresnel lens elements respectively disposed on the left side and the right side of the head-mounted device.

10. The head-mounted device according to claim 2, wherein the viewing lens elements comprise two metalens elements respectively disposed on the left side and the right side of the head-mounted device.

11. The head-mounted device according to claim 2, wherein the display device comprises a curved screen.

12. The head-mounted device according to claim 2, wherein the two inside cameras are two hole-punch camera modules symmetrically disposed at the lower left side and the lower right side of the displaying surface.

13. The head-mounted device according to claim 2, wherein the two inside cameras are two under display camera modules.

14. The head-mounted device according to claim 2, wherein the two inside cameras are two infrared camera modules.

15. The head-mounted device according to claim 2, wherein the two inside cameras are two eye tracking cameras.

16. A head-mounted device, comprising:
a plurality of front camera modules, comprising a first camera module and a second camera module respectively disposed at two ends of the head-mounted device;
a depth sensing module, comprising an infrared camera module and an infrared illuminator;
a display device;
an in-display camera module, disposed within a boundary of the display device; and
an image-processing unit, being in communication connection with the plurality of front camera modules, the depth sensing module and the display device;
wherein the first camera module and the second camera module face a front side of the head-mounted device, the display device and the in-display camera module face a user side of the head-mounted device, the front side of the head-mounted device is an opposite side of the user side of the head-mounted device, and the in-display camera module comprises two inside cameras and two infrared illuminators which are disposed on or inside a displaying surface of the display device;
wherein the two inside cameras of the in-display camera module are respectively disposed at a lower left side and a lower right side of the displaying surface, and the two infrared illuminators of the in-display camera module are respectively disposed at an upper left side and an upper right side of the displaying surface.

17. The head-mounted device according to claim 16, wherein at least one of the plurality of front camera modules has a maximum field of view larger than 100 degrees.

18. The head-mounted device according to claim 16, wherein the display device comprises a light-passable display device.

19. The head-mounted device according to claim 16, further comprising two viewing lens elements disposed on a user side of the display device.

20. The head-mounted device according to claim 19, further comprising a lens actuator coupled to the viewing lens elements, and the viewing lens elements are independently movable by the lens actuator.

21. A head-mounted device, comprising:
at least one front camera module;
a display device;
two viewing lens elements;
an in-display camera module, disposed within a boundary of the display device; and
an image-processing unit, being in communication connection with the at least one front camera module and the display device;
wherein the at least one front camera module faces a front side of the head-mounted device, the display device is configured to display images captured by the at least one front camera module, and the display device, the in-display camera module and the viewing lens elements face a user side of the head-mounted device, the front side of the head-mounted device is an opposite side of the user side of the head-mounted device, and the in-display camera module comprises two inside cameras and two infrared illuminators which are disposed on or inside a displaying surface of the display device;
wherein the two inside cameras of the in-display camera module are respectively disposed at a lower left side and a lower right side of the displaying surface, and the two infrared illuminators of the in-display camera module are respectively disposed at an upper left side and an upper right side of the displaying surface.

22. The head-mounted device according to claim 21, wherein the two inside cameras are two eye tracking cameras.

23. The head-mounted device according to claim 22, wherein the two eye tracking cameras are two under display camera modules.

24. The head-mounted device according to claim 22, wherein the two eye tracking cameras are two infrared camera modules.

25. The head-mounted device according to claim 21, further comprising a lens actuator coupled to the viewing lens elements, and the viewing lens elements are independently movable by the lens actuator.

* * * * *